United States Patent Office 3,649,647
Patented Mar. 14, 1972

3,649,647
MIXED SUGAR ALCOHOL ESTERS OF HIGHER AND LOWER SATURATED FATTY ACIDS
Masanori Ota, Osaka-shi, and Seishiro Yoshikawa, Yamato-Takada-shi, Japan, assignors to Okamura Oil Mill Limited, Kawahara-cho, Kashwara-shi, Osaka-fu, Japan
Filed Sept. 15, 1969, Ser. No. 857,725
Claims priority, application Japan, Sept. 21, 1968, 43/68,571
Int. Cl. C07c *69/32;* C07d *7/04;* A23d *5/00*
U.S. Cl. 260—345.8    7 Claims

ABSTRACT OF THE DISCLOSURE

A sugar alcohol ester comprising an ester of sugar alcohol having 5 to 6 carbon atoms with 1 to 3 moles per mole of sugar alcohol of a higher saturated fatty acid having 14 to 18 carbon atoms and at least one mole per mole of sugar alcohol of a lower saturated fatty acid having 2 to 4 carbon atoms, said ester having a melting point of 30 to 40° C., a hydroxyl value of 0 to 100 and a saponification value of 210 to 300; and a process for manufacturing said sugar alcohol ester from a sugar alcohol of 5 to 6 carbon atoms, high saturated fatty acid of 14 to 18 carbon atoms and lower saturated fatty acid of 2 to 4 carbon atoms. Said sugar alcohol ester is useful for edible fat, fat for suppositories, etc.

---

Figure 1:
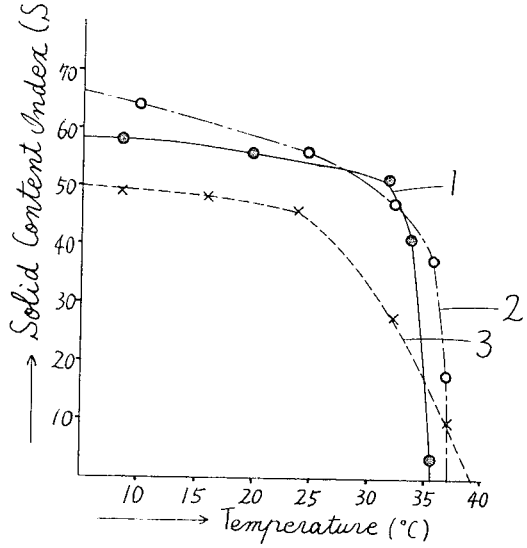

This invention relates to sugar alcohol esters and a process for manufacturing the same, more particularly to novel esters of sugar alcohols and fatty acids which are useful for edible, fat, fat for suppositories, etc.

The sugar alcohol ester of the invention is an ester of a sugar alcohol having 5 to 6 carbon atoms with 1 to 3 moles, per mole of the sugar alochol, of a higher saturated fatty acid having 14 to 18 carbon atoms and at least one mole, per mole of the sugar alcohol, of a lower saturated fatty acid having 2 to 4 carbon atoms, said ester having a melting point of 30 to 40° C., a hydroxyl value of 0 to 100 and a saponification value of 210 to 300.

The present sugar alcohol ester has various useful properties for edible fat, fat for suppositories, etc. For example, it has the melting point ranging from 30 to 40° C. near to the body temperature of man which is so sharp that when heated at the melting point or higher it melts instantly to change into a liquid form. Further the present ester has a moderate brittleness peculiar to natural cacao butter but no plasticity at room temperature and has good surface luster free of fat blooming in solid state.

These properties quite resemble those of natural cacao butter and therefore the present esters can be advantageously used as a cacao butter substitute in a wide variety of uses in which natural cacao butter has been used, especially in the production of confections and suppositories. The esters of the invention, moreover, may be used as powdered fat, dry oil, etc. in place of other natural edible fat or oil, such as butter fat, hardened coconut oil, hardened corn oil, etc. In general, powdered fat or dry oil may be produced by pulverizing the natural edible fat or oil at a temperature as low as below —20° C., but the resultant powder is liable to be subjected to so called blocking phenomenon at a room temperature, as the melting point of the natural fat or oil is not sharp. The present esters can easily be pulverized at 0–10° C. to produce powdered fat or dry oil free of blocking at a temperature lower than the melting point thereof. Furthermore, since the present esters have no taste and smell and are free from a peculiar flavor like caco butter, they can be flavored or seasoned when used in soup or the like food as a powdered fat. In addition the esters of the invention have high stability to oxidation as they contain in the molecule no unsaturated fatty acid.

Natural cacao butter is not available in the temperate regions and must be imported from the tropics. In addition, useful cacao butter having a sharp melting point cannot be obtained without complicated tempering procedures because of pronounced polymorphism thereof.

The present ester having quite similar or superior properties to natural cacao butter, on the other hand, is obtainable from sugar alcohols and fatty acids which are far more easily available than natural cacao butter and there is no need to subject the present ester to complicated procedures like tempering as it has a sharp melting point free of polymorphism.

While various attempts have been made to obtain cacao butter substitutes, nothing similar or superior to natural cacao butter has been obtained yet. In most attempts heretofore made it was intended to get the substitutes having chemical structure similar to that of natural cacao butter, but the products thus obtained were far from a natural one in aroma, flavor and feel to teeth and tongue. On the contrary, the esters of the invention prepared from sugar alcohols are substantially different in chemical structure from natural cacao butter which is a higher fatty acid ester of glycerine, but the properties thereof are quite similar or superior to those of natural cacao butter in practical uses. Particularly in the sharpness of the melting point the present esters excel that of natural cacao butter, giving better feel to teeth and tongue when used for preparation of chocolate and like confections. Of the present esters, accordingly, those having a melting point of 32 to 36° C. slightly below the body temperature are especially useful for the cacao butter substitute.

The present esters must be composed of a sugar alcohol of 5 to 6 carbon atoms, a higher saturated fatty acid of 14 to 18 carbon atoms and a lower saturated fatty acid of 2 to 4 carbon atoms. Other combinations of alcohols and carboxylic acids not only fail to produce the ester having a sharp melting point of 30 to 40° C. but also have properties different from those of the natural cacao butter. In fact, the present inventors prepared many esters from various combinations of hydroxyl group-containing compounds, such as ethyl alcohol, propylene glycol, raffinose, sucrose, etc. and various carboxylic acids, such as lauric acid, myristic acid, palmitic acid, stearic acid, oleic acid, linoleic acid, maleic acid, citric acid, succinic acid, tartaric acid, etc., and the esters having a melting point of 30 to 40° C. were checked. However, nothing similar to the natural cacao butter in properties was obtained. That is to say, most of them lacked the sharpness of melting point indispensable for a cacao butter substitute, and further some were highly viscous in a molten state and not tasty, some had plasticity but no brittleness peculiar to the natural cacao butter with poor feel to teeth and tongue, and some others showed fat blooming and sweating or had disagreeable smell or bitterness.

The sugar alcohols which constitute the present ester have 5 to 6 carbon atoms, and include, for example, xylitol, sorbitol, mannitol and sorbitan, the most desirable being sorbitan. The higher saturated fatty acids of 14 to 18 carbon atoms are myristic acid, pentadecanoic acid, palmitic acid, margaric acid or stearic acid, and the lower saturated fatty acids are acetic acid, propionic acid or butyric acid. The preferable higher fatty acid is palmitic acid, and the preferable lower fatty acid is acetic acid.

The molar ratio of higher fatty acid and lower fatty acid to sugar alcohol in the present ester is also an important factor. The higher fatty acid should be in the range of 1 to 3 moles, preferably 2 to 3 moles per mole of sugar alcohol, and the lower fatty acid should be at least one mole per mole of sugar alcohol. Preferable esters of the invention are those in which a sugar alcohol is esterified with 1 to 3 moles of a higher fatty acid and all free hydroxyl groups contained in the sugar alcohol-higher fatty acid ester are esterified with a lower fatty acid.

The ester of the invention has a melting point of 30 to 40° C., so that it can be used as an edible fat and in the production of suppositories. Particularly those having a melting point of 32 to 36° C. which is slightly lower than the body temperature can be advantageously used as a cacao butter substitute. The hydroxyl value and saponification value of the present ester should be in the range of 0 to 100, preferably 0 or less than 50, and in the range of 215 to 300, preferably 230 to 270, respectively. If the ester has a higher hydroxyl value or a higher or lower saponification value it will lack in the sharpness of the melting point or have undesired plasticity without brittleness in a solid state.

The present ester may be prepared by first esterifying a sugar alcohol with a higher fatty acid to produce the intermediate ester of one mole of sugar alcohol and 1 to 3 moles of higher fatty acid and further esterifying the intermediate ester with a lower fatty acid.

The first-step esterification reaction may be carried out with stirring in a molten state at an elevated temperature of 180 to 270° C. under atmospheric pressure or reduced pressure of not lower than 50 mm. Hg. The reaction may preferably be conducted in nitrogen gas and like inert gas streams. The higher fatty acid may preferably be used alone in a stoichiometric amount ranging from one to three moles per mole of the sugar alcohol, though the fatty acids may be used in mixture with one another. The purer the acid, the better it is, but it may contain as an impurity higher unsaturated carboxylic acid, such as oleic acid, linoleic acid, etc. in an amount of not higher than 10 percent by weight. To accelerate the reaction an alkaline substance, such as NaOH, $CaCO_3$, etc. may be added to the reaction system. The reaction is usually completed within one to five hours, and when stirring is stopped the molten reaction product is separated as upper layer from a small amount of unreacted materials in lower layer. The reaction product is usually a mixture of mono-, di- and tri-fatty acid esters of sugar alcohol, and the respective esters can be separated from one another by solvent fractional crystallization and like procedures. The solvent fractional crystallization may be carried out by using organic solvents, such as methyl alcohol, ethyl alcohol, etc. In the process of the invention it is preferable to subject each ester separated from the other to the subsequent reaction, though such ester mixture may also be used in the subsequent reaction as it is.

The second-step esterification reaction may be carried out while refluxing the lower fatty acid used under atmospheric pressure. As the lower fatty acid an anhydride thereof is preferably used. In this reaction the lower fatty acid may preferably be used in stoichiometric or excess amount i.e., in at least one mole per mole of the ester of sugar alcohol and higher fatty acid. The excess acid unreacted can easily be removed from the products by distillation or washing with hot water.

The product thus obtained is preferably subjected to decolorization and deoderization procedures. The decolorization may be conducted by adding activated clay and activated carbon to the product and heating the mixture at 80 to 120° C., followed by filtration. Activated clay and carbon are usually added in the range of 1 to 5 weight percent, based on the weight of the product. The deoderization may be carried out by heating the product with stirring under reduced pressure while injecting steam into the product. A reduced pressure of less than 10 mm. Hg and a temperature of 200 to 270° C. are applied.

The resultant product thus obtained is a mixture of esters in which mole numbers of the higher fatty acid and of the lower fatty acid per mole of the sugar alcohol are different. According to the research of the present inventors it has been found that such mixture of esters has the same useful properties as each ester in practical uses, as far as such mixture essentially consists of two or more species of the present esters and has a melting point of 30 to 40° C., hydroxyl value of 0 to 100 and saponification value of 210 to 300. Accordingly there is no need to separate respective esters from the ester mixture, though each ester may be isolated from one another by solvent fractional crystallization with n-hexane, acetone, ethyl alcohol and like organic solvents. In addition the present esters and the mixture thereof are non-toxic, tasteless and odorless, so that they may be used in a wide variety of uses.

For better understanding of the invention examples are given below, in which all parts are by weight.

EXAMPLE 1

To 164 parts of sorbitan was added 768 parts of palmitic acid and the mixture was heated with stirring in nitrogen gas stream at 230° C. for 2 hours for esterification. The stirring was stopped and the upper layer reaction product was taken out in a molten state.

In a three-necked flask with a reflux condenser was placed 100 parts of the resultant ester and cooled to a temperature of 80° C., to which 25 parts of acetic anhydride and 0.1 part of sulfuric acid were added and the mixture was refluxed for 4 hours. The resultant reaction product was placed in a separating funnel and washed with boiling water for three times, and then dried under reduced pressure. To the dried product were added 1 part of activated clay and 5 parts of activated carbon and heated at 120° C. for 1 hour for decolorization. After filtration the product thus treated was heated at 230° C. under a reduced pressure of 3 mm. Hg, to which steam heated at 180° C. was injected with stirring in 4% by weight for 1.5 hours for deodorization. The product thus treated was dissolved in the twice amount of ethanol and left to stand at 7° C. for 8 hours. The crystals precipitated were separated by filtration and washed with ethanol cooled to 0° C. The evaporation of the ethanol gave 78 parts of a light-brown solid having a melting point of 34.5° C., hydroxyl value of 23 and saponification value of 243.

Said solid was ascertained by further solvent fractional crystallization with ethanol and gas chromatographic analysis to be a mixture containing as a main component sorbitan tripalmitate ester monoacetate and 38 percent by weight of sorbitan dipalmitate ester monoacetate.

FIG. 1 attached hereto shows the relation between solid content indexes and temperatures applied of the ester mixture of the invention obtained in Example 1, in which such relations of the natural cacao butter and of the cacao butter substitute prepared from chia oil are also shown for comparison. The cacao butter substitute from chia oil tested was prepared in the following manner:

5 parts of chia oil was dissolved with stirring in 15 parts of saturated aqueous solution of ethyl acetate by heating at 50° C. for 20 minutes and kept at 30° C. for 3 hours to separate water and unsaponified substance. The resultant product was cooled to 1° C. in about 1 hour and left to stand at this temperature for 1 hour. The crystals precipitated were filtered out, and the filtrate was further cooled to −3° C. and left to stand at this temperature for 1 hour. The crystals thus precipitated were filtered and removal of the solvent gave 1.65 parts of solid fat having a melting point of 34.5° C. and iodine value of 38.

Though the present ester mixture was not tempered, the natural cacao butter and the substitute from chia oil were tempered under the following conditions:

(1) melted at 45° C.,
(2) cooled to 25° C. in 10 minutes,
(3) left to stand at this temperature for 10 minutes,
(4) heated to 32° C. in 30 minutes, (5) left to stand at this temperature for 60 minutes, and (6) cooled to 20° C. in 20 minutes.

It is evident from FIG. 1 that the curve 1 showing the relation between solid content index and temperature applied of the present ester mixture inclines most steeply at a temperature slightly below the body temperature as compared with the curves 2 and 3 showing such relations of the natural cacao butter and the cacao butter substitute from chia oil respectively, so that the present ester mixture not tempered has a sharper melting point than that of the natural cacao butter tempered.

Figure 2:
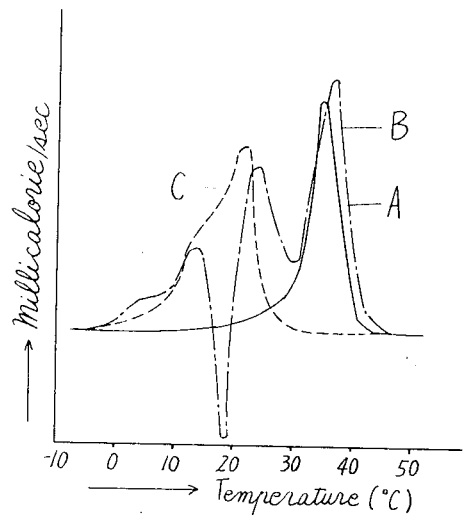

This fact becomes more clear from FIG. 2 which shows the differential thermal analysis curve at −20 to 70° C. of the ester mixture obtained in Example 1 and those of two kinds of the natural cacao butter. One sample of the natural cacao butter was tempered under the same conditions as described above and the other was not tempered. From this FIG. 2 it is seen that the thermogram A of the present ester mixture of Example 1 shows marked evolution of heat at a temperature near to the body temperature, while the thermogram B of the tempered cacao butter still shows polymorphism and the thermogram C of the non-tempered cacao butter shows a large width between initial and complete melting.

The differential thermal analysis was conducted for the ester mixture of Example 1 tempered in the same manner as in the case of the natural cacao butter, but the thermogram thereof was almost the same as the curve A of the non-tempered one in FIG. 2.

Sensory test was conducted by using the ester mixture obtained in Example 1 in accordance with Scheffe-Ura method described in "Kanno Kensa Hand Book" ("Sensory Test Hand Book") published, on Feb. 19, 1962, by The Union of Japanese Scientists and Engineers, Inc.

For comparison the following samples were also tested.

(I) Natural cacao butter.
(II) Cacao butter substitute from chia oil prepared by the same manner as before.
(III) Acetylated glycerine monopalmitate having a melting point of 35° C. and hydroxyl value of 28 prepared by reacting one mole of glycerine monostearate with two moles of acetic anhydride under reflux condition for two hours, From each sample chocolate-like substance was prepared in the following manner:

| | Wt. percent |
|---|---|
| Cocoa powder | 40 |
| Coffee powder | 17 |
| Sodium cyclamate | 2 |
| Lecithin | 1 |
| Sugar | 40 |

To the above mixture was added the same amount of each sample fat and the mixture obtained was fully conched at 50° C. The chocolate sample containing the present ester mixture was cooled without tempering, while the others were tempered in the same manner as described before.

The feel to teeth and tongue of the respective chocolate samples was tested by five specialists in a panel spalling test. The test results were evaluated in accordance with the following criteria and the average value of the results are shown in Table 1 below:

+2—Excellent
+1—Good
0—Medium
−1—Slightly poor
−2—Poor

TABLE 1

| Sample | Average |
|---|---|
| Ester mixture of Example 1 | 0.250 |
| Comparative sample I | 0.150 |
| Comparative sample II | −0.075 |
| Comparative sample III | −0.325 |

From these results the ester of the invention exhibited a markedly excellent property over the other samples. By further analysis of the data of the experiments it was ascertained that the main effect at the level of significance of 1% was significant.

EXAMPLE 2

To 164 parts of sorbitan was added 276 parts of mixed aliphatic acid prepared by hydrogenation of tallow acid and the mixture was heated with stirring at 220° C. for 3 hours for esterification. The stirring was stopped and the resultant ester was taken out from the system. The mixed aliphatic acid used contained the following components:

| | Weight percent |
|---|---|
| Myristic acid | 0.4 |
| Palmitic acid | 18.5 |
| Palmitoleic acid | 2.8 |
| Stearic acid | 72.1 |
| Oleic acid | 6.2 |

400 parts of the resultant ester was cooled to 80° C., to which was added 240 parts of acetic anhydride and the mixture was refluxed for 6 hours. The product thus obtained was washed with water, decolorized and deodorized in the same manner as in Example 1. The solvent fractional crystallization conducted in the same manner as in Example 1 gave 94 parts of a light-brown solid having a melting point of 36.2° C., hydroxyl value of 3.5 and saponification value of 299.

This solid was ascertained by further solvent fractional crystallization and gas chromatographic analysis to be a mixture of sorbitan dihigher fatty acid ester diacetate and 92 weight percent of sorbitan monohigher fatty acid ester triacetate.

EXAMPLE 3

To 164 parts of sorbitan was added 640 parts of palmitic acid and the mixture was heated with stirring at 230° C. for 3 hours for esterification. The stirring was stopped and the resultant ester was taken out from the system.

100 parts of the resultant ester was cooled to 80° C., to which was added 30 parts of butyric anhydride and the mixture was refluxed for one hour. After the unreacted butyric anhydride was recovered under reduced pressure 20 parts of acetic anhydride was added to the reaction mixture and heated at 140 to 160° C. for 2 hours. The resultant product was washed with boiling water for three times and decolorized and deodorized in the same manner as in Example 1. The solvent fractional crystallization conducted in the same manner as in Example 1 gave 93 parts of a substance having a melting point of 35° C., hydroxyl value of 25 and saponification value of 250.

This substance was ascertained by further solvent fractional crystallization and gas chromatographic analysis to be a 42:58 weight ratio mixture of sorbitan dipalmitate-dilower fatty acid ester and sorbitan tripalmitate-monolower fatty acid ester, and that the weight ratio of butyric acid and acetic acid bonded was 32:68.

EXAMPLE 4

To 164 parts of mannitol was added 512 parts of palmitic acid and the mixture was heated with stirring at 230° C. for 3 hours for esterification. The stirring was stopped and the resultant ester was taken out from the system.

100 parts of the ester was cooled to 80° C., to which were added 85 parts of propionic anhydride and 0.2 part of sulfuric acid and the mixture was refluxed for 6 hours. The product thus obtained was washed with boiling water for three times and after dried under reduced pressure was decolorized and deodorized in the same manner as in Example 1. The solvent fractional crystalliza- tion conducted in the same manner as in Example 1 gave 96 parts of a substance having a melting point of 36.5° C., hydroxyl value of 88.6 and saponification value of 255.

The substance thus obtained was ascertained in the same manner as in Example 1 to be a mixture of mannitol dipalmitate ester monopropionate and 89 weight percent of mannitol dipalmitate ester dipropionate.

EXAMPLE 5

To 152 parts of xylitol was added 256 parts of palmitic acid and the mixture was heated with stirring at 200° C. for 4 hours for esterification. The stirring was stopped and the resultant ester was taken out from the system.

100 parts of the ester was cooled to 80° C., to which was added 70 parts of acetic anhydride and the mixture was refluxed for 5 hours. The product thus obtained was washed with water, decolorized and deodorized in the same manner as in Example 1. The solvent fractional crystallization conducted in the same manner as in Example 1 gave 91 parts of a brittle substance having a melting point of 35° C., hydroxyl value of 68 and saponification value of 258.

This substance was ascertained in the same manner as in Example 1 to be a mixture of xylitol monopalmitate ester triacetate and 58 weight percent of xylitol monopalmitate ester diacetate.

What we claim is:

1. A sugar alcohol ester comprising an ester of sugar alcohol having 5 to 6 carbon atoms with 1 to 3 moles per mole of sugar alcohol of a higher saturated fatty acid having 14 to 18 carbon atoms and at least one mole per mole of sugar alcohol of a lower saturated fatty acid having 2 to 4 carbon atoms, said ester having a melting point of 30 to 40° C., a hydroxyl value of 0 to 100 and a saponification value of 210 to 300.

2. The sugar alcohol ester according to claim 1, in which said sugar alcohol is xylitol, sorbitol, mannitol or sorbitan.

3. The sugar alcohol ester according to claim 2, in which said sugar alcohol is sorbitan.

4. The sugar alcohol ester according to claim 1, in which said higher fatty acid is palmitic acid.

5. The sugar alcohol ester according to claim 1, in which said lower fatty acid is acetic acid.

6. The sugar alcohol ester according to claim 1, in which said melting point is in the range of 32 to 36° C.

7. The sugar alcohol ester according to claim 1, in which said hydroxyl value is in the range of 0 to 50 and said saponification value is in the range of 230 to 270.

References Cited

UNITED STATES PATENTS

| | | | |
|---|---|---|---|
| 2,558,025 | 6/1951 | Wicks | 260—410.6 |
| 2,996,387 | 8/1961 | Radlove | 99—118 |

LEWIS GOTTS, Primary Examiner

D. G. RIVERS, Assistant Examiner

U.S. Cl. X.R.

99—118 H, 118 R, 118 P, 23, 124, 134; 260—347.4, 410.6; 424—365